United States Patent [19]

Dworkin

[11] 4,279,807

[45] Jul. 21, 1981

[54] SYNERGISTIC HEAT STABILIZER COMPOSITIONS CONTAINING AN ANTIMONY OR A BISMUTH COMPOUND

[75] Inventor: Robert D. Dworkin, Old Bridge, N.J.

[73] Assignee: M&T Chemicals Inc., Woodbridge, N.J.

[21] Appl. No.: 103,364

[22] Filed: Dec. 13, 1979

Related U.S. Application Data

[62] Division of Ser. No. 72, Jan. 2, 1979, Pat. No. 4,231,895.

[51] Int. Cl.$^3$ .................... C08K 5/57; C08K 5/56; C08K 5/53; C08K 5/52; C08K 5/36; C08K 5/13

[52] U.S. Cl. .................. 260/45.75 B; 260/45.75 Z; 260/45.95 J; 260/45.95 D

[58] Field of Search ............... 260/45.75 Z, 45.75 B, 260/45.8 R, 45.8 RB, 45.75 W, 45.8 NZ, 45.8 N, 45.95 D, 45.95 L

[56] References Cited

U.S. PATENT DOCUMENTS

| | | | |
|---|---|---|---|
| B 479,556 | 3/1976 | Luders et al. | 260/45.8 R |
| 2,461,531 | 2/1949 | Cox et al. | 260/45.75 B |
| 2,488,975 | 11/1949 | Hunter | 260/45.75 B |
| 2,560,160 | 7/1951 | Deutsch et al. | 260/45.75 B |
| 2,680,726 | 6/1954 | Weinberg et al. | 260/45.75 B |
| 2,684,956 | 7/1954 | Weinberg et al. | 260/45.75 B |
| 2,801,988 | 8/1957 | Fischer et al. | 260/45.75 B |
| 2,934,548 | 4/1960 | Fath | 260/45.75 B |
| 3,287,210 | 11/1966 | Leebrick | 260/45.75 B |
| 3,322,859 | 5/1967 | Sherr et al. | 260/45.8 R |
| 3,327,024 | 6/1967 | De Young et al. | 260/45.8 R |
| 3,345,326 | 10/1967 | Chang et al. | 260/45.8 RB |
| 3,361,672 | 2/1968 | Andress et al. | 260/45.8 RB |
| 3,399,220 | 8/1968 | Remes et al. | 260/45.75 B |
| 3,415,749 | 12/1968 | Bridger | 260/45.75 Z |
| 3,442,807 | 5/1969 | Law | 260/45.8 RB |
| 3,459,835 | 8/1969 | Dever et al. | 260/45.8 R |
| 3,493,536 | 2/1970 | Weisfeld et al. | 260/45.75 B |
| 3,493,637 | 2/1970 | Hull | 260/45.95 D |
| 3,530,158 | 9/1970 | Leebrick et al. | 424/296 |
| 3,632,690 | 1/1972 | Dever et al. | 260/45.8 R |
| 3,645,971 | 2/1972 | Hindersinn | 260/45.8 R |
| 3,647,746 | 3/1972 | Seki et al. | 260/45.75 Z |
| 3,887,508 | 6/1975 | Dieckmann | 260/23 XA |
| 4,029,618 | 6/1977 | Dieckmann | 260/23 XA |

*Primary Examiner*—V. P. Hoke
*Attorney, Agent, or Firm*—Stanley A. Marcus; Donald G. Marion; Robert Spector

[57] ABSTRACT

The combination of a conventional antimony- or bismuth-containing heat stabilizers with certain aromatic esters or aryloxides containing boron, phosphorus, silicon, antimony, tin or zinc interacts synergistically to provide an unexpectedly high level of heat stability to halogen-containing polymers such as polyvinyl chloride (PVC). In addition the aromatic ester or aryloxide inhibits spontaneous degradation of the heat stabilizing component in the presence of heat and/or light.

13 Claims, No Drawings

SYNERGISTIC HEAT STABILIZER COMPOSITIONS CONTAINING AN ANTIMONY OR A BISMUTH COMPOUND

This is a divisional of application Ser. No. 000,072, issued Jan. 2, 1979, now U.S. Pat. No. 4,231,895.

BACKGROUND OF THE INVENTION

This invention relates to heat stabilizers for polymers derived from halogen-containing ethylenically unsaturated compounds such as vinyl chloride and vinylidene chloride. This invention further relates to heat stabilizers for halogen-containing polymers containing an antimony or bismuth compound and a second component which synergistically improves the level of heat stability imparted by the antimony or bismuth compound.

The efficacy of certain compounds of antimony and bismuth as heat stabilizers for halogen-containing polymers such as polyvinyl chloride is well known. For example, U.S. Pat. Nos. 2,680,726; 2,684,956; 3,399,220; 3,466,261; 3,493,536; 2,161,024; 2,461,531; 2,556,420; 2,556,208; 2,801,988 and 3,530,158 disclose various sulfur- and non-sulfur-containing antimony compounds that are useful for this purpose. While these antimony compounds do impart considerable heat stability to halogen-containing polymers they have a number of disadvantages, two of the more serious ones being the tendency of many antimony compounds to exude from the polymer composition and the inherent instability of some sulfur-containing antimony compounds upon exposure to heat or light for relatively short periods of time.

In addition, antimony compounds are often more costly than other conventional heat stabilizers and do not possess any advantages in performance to balance their shortcomings. These disadvantages have delayed the commercial acceptance of antimony compounds as heat stabilizers for halogen-containing polymers.

It has now been found that the long-term stability of certain antimony and bismuth compounds and the efficacy of these compounds as heat stabilizers for halogen-containing polymers such as polyvinyl chloride can be synergistically improved by the presence of aryloxides or aromatic esters containing boron, phosphorus, silicon, antimony, tin or zinc.

SUMMARY OF THE INVENTION

This invention provides improved compositions for imparting heat stability to polymers of ethylenically unsaturated hydrocarbons. The compositions comprise a heat stabilizer selected from the group represented by the formulae $MX_3$, $MX_nY_{3-n}$, $RM=S$ and $R_nMX_{3-n}$ wherein M is antimony or bismuth, R is hydrocarbyl, n is 1 or 2 and X and Y each represent the residue obtained by removing (1) the hydrogen atom from the carboxy (—COOH) group of a mono- or polyfunctional carboxylic acid or mercaptocarboxylic acid or (2) the hydrogen atom from the sulfur atom of a mercaptan, mercaptoalkanol, mercaptocarboxylic acid or an ester of a mercaptocarboxylic acid or mercaptoalkanol, and wherein the improvement resides in the presence in said composition of a compound containing at least one residue obtained by removing one or both hydrogens from the two hydroxyl groups of a o-dihydric phenol, said residue being bonded through oxygen to an element selected from the group consisting of boron, phosphorus, silicon, antimony, tin and zinc.

DETAILED DESCRIPTION OF THE INVENTION

The aromatic ester or aryloxide compound disclosed in the preceeding Summary of the Invention and defined in greater detail hereinafter effectively retards decomposition of the inherently unstable antimony- or bismuth-containing heat stabilizer in the presence of moisture, heat and/or light in addition to synergistically improving the performance of the heat stabilizer.

The heat stabilizing component of the present compositions can be represented by one of the three foregoing generic formula. Alternatively, this component can be represented by one of the following seven formulae, which indicate in greater detail the various hydrocarbyl, sulfur- and oxygen-containing groups that can be bonded to the antimony or bismuth atom.

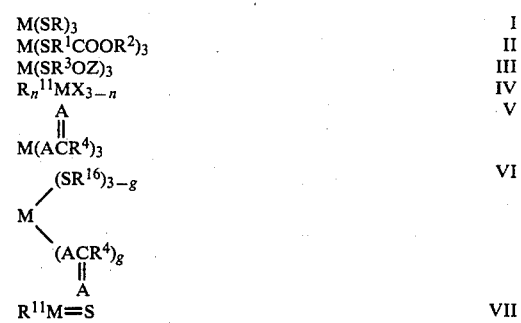

In the foregoing formulae I–VII M represents either antimony or bismuth, antimony compounds being preferred. A is oxygen or sulfur and R represents a hydrocarbyl group. As used in this specification the term "hydrocarbyl" includes alkyl, cycloalkyl, aryl, alkaryl or aralkyl. The alkyl portion of any hydrocarbyl group contains from 1 to 20 carbon atoms. The hydrocarbyl group may contain one or more substituents, such as hydroxyl. In this instance the group "—SR" in the foregoing formula I could represent the residue of a mercapto-alcohol remaining following removal of hydrogen from the mercapto (—SH) group, and R could be represented by

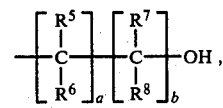

wherein $R_5$, $R_6$, $R_7$, $R_8$, a and b are defined hereinafter.

Compounds corresponding to the formula $M(SR)_3$ are prepared by reacting a mercaptan or mercaptoalcohol represented by the formula HSR with an antimony or bismuth trihalide in the presence of an acid acceptor or with antimony or bismuth oxide. It has been previously disclosed that the residue remaining following removal of the mercapto (—SH) group of suitable mercaptoalcohols exhibits the general formula

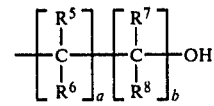

wherein $R^5$ and $R^7$ are individually selected from hydrogen, hydroxyl, halogen, mercapto, alkoxy, aryloxy and alkyl containing from 1 to 8 carbon atoms. The groups represented by $R^6$ and $R^8$ are hydrogen or alkyl containing from 1 to 18 carbon atoms. The terms a and b each represent an integer from 1 to 20, inclusive. The foregoing definitions are based on the proviso that the group R contains from 1 to 20 carbon atoms, as previously defined.

Compounds represented by the general formula II, $M(SR^1COOR^2)_3$, are derivatives of mercaptocarboxylic acid esters. In this formula $R^1$ represents alkylene, arylene or aralkylene (e.g. xylyl) wherein any alkylene or aralkylene group contains from 1 to 20 carbon atoms and $R^2$ represents a substituted or unsubstituted alkyl, aryl or aralkyl (e.g. benzyl) group. Typically $R^1$ represents the hydrocarbyl portion of a mercaptoacetic, β-mercaptopropionic, thiomalic, thiosalicylic or other mercaptocarboxylic acid containing from 1 to 21 carbon atoms, and $R^2$ represents the hydrocarbyl or hydroxyhydrocarbyl portion of the esterifying alcohol, which contains from 1 to 20 carbon atoms and typically can be methanol, n-propanol, iso-propanol, n-butanol, the isomeric octanols and decanols, glycerol, ethylene glycol, phenoxyethanol, pentaerythritol or trimethylol propane. Readily available mercaptoacid esters that can be employed to prepare compounds corresponding to the foregoing formula II include methyl mercaptoacetate, amyl mercaptoacetate, isooctylmercaptoacetate, isodecylmercaptoacetate, dodecylmercaptoacetate, octadecylmercaptoacetate and in general the esters of mono and dibasic aliphatic and aromatic mercaptoacids, such as esters of beta-thiopropionic acid, thiolactic acid, thiobutyric acid and mercaptolauric acid.

In the foregoing formula III, which represents antimony or bismuth derivatives of mercaptoalkanol esters, $R^3$ is alkylene, contains at least 2 carbon atoms and exhibits the formula

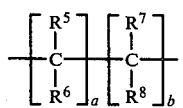

and Z represents the residue obtained by removing the hydroxyl portion of a carboxy group from a mono- or polycarboxylic acid. All of the "R" terms in this formula have been previously defined. The group —SR$^3$OZ in formula III can represent, for example, the residue obtained by removal of the hydrogen atom from the mercapto group of 2-mercaptoethyl caprylate, 2-mercaptoethyl isooctyl maleate, 3-mercaptopropyl butyl azelate or 1-thioglyceryl oleate.

Generic formula IV, $R_n{}^{11}MX_{3-n}$, is representive of organoantimony or organobismuth derivatives of mercaptides, mercaptoalkanol esters, mercaptoacid esters, carboxylic acids, thiocarboxylic acids, alcohols and phenols. $R^{11}$ represents alkyl, cycloalkyl, alkenyl, alkynyl, aryl, cycloalkenyl or aralkyl, each of which may contain one or more substituents such as alkoxy, hydroxyl or amino groups. The alkyl portion of any group represented by $R^{11}$ contains from 1 to 20 carbon atoms. The term "X" represents one of the aforementioned anionic residues (mercaptide, mercaptoester, etc.) and is bonded to the metal atom through oxygen or sulfur. If X represents the residue of a mercaptoacid ester, X can be further defined as —SR$^1$COOR$^2$. $R^1$ and $R^2$ have been previously defined in the discussion of formula II and n is 1 or 2.

Formula VII, $R^{11}M$=$S$, represents the class of organoantimony- and organobismuth sulfides exemplified by butylantimony sulfide.

When $R^{11}$ of formulae IV and VII represents alkyl, this definition includes, for example, methyl, ethyl, n-propyl, i-propyl, n-butyl, i-butyl, n-amyl, n-octyl and 2-ethylhexyl in addition to substituted alkyls such as phenylethyl and benzyl. Typical alkenyl groups include vinyl, 2-propenyl (i.e. allyl), 1-propenyl, 1-butenyl and 2-butenyl, in addition to inertly substituted alkenyl groups exemplified by 4-phenylbuten-1-yl. Typical cycloalkyl groups include cyclohexyl, cycloheptyl and cyclooctyl in addition to inertly substituted cycloalkyl groups such as 2-methyl cycloheptyl, 3-butyl cyclohexyl. Typical alkynyl groups include propyn-1-yl, propyn-2-yl, butyn-1-yl, phenylethynyl and ethynyl. Typical aryl groups include phenyl, tolyl, xylyl, chlorophenyl and dimethylaminophenyl. Where more than one $R^{11}$ or X is present in formula IV, these can be identical or different. Typical mercaptide residues represented by X include phenyl mercaptide, lauryl mercaptide, butyl mercaptide and dimercaptides wherein the hydrocarbon group is divalent aliphatic, cycloaliphatic, or aromatic. Specific compounds when n of formula IV is 1 or 2 include n-butyl antimony dilaurylmercaptide, di-n-butyl antimony lauryl mercaptide, diphenyl antimony lauryl mercaptide, ditolyl antimony n-amyl mercaptide, dibenzyl antimony benzyl mercaptide, diallyl antimony cyclohexyl mercaptide, diphenyl antimony allylmercaptide, dicyclohexyl antimony n-hexyl mercaptide, ditolyl antimony phenyl mercaptide, di-isopropyl antimony 2-ethylhexyl mercaptide, di-p-chlorophenyl antimony n-butyl mercaptide and diphenylantimony ethylmercaptoacetate. Patents disclosing such antimony compounds include U.S. Pat. Nos. 3,530,158 and 3,399,220. When X represents the residue of an alcohol or a monohydric phenol, typical compounds of this type include methanol, ethanol, 2-ethylhexanol, phenol, nonylphenol and the isomeric xylenols.

Compounds corresponding to the foregoing formula V,

are derivatives of carboxylic, thiocarboxylic and dithiocarboxylic acid, depending upon the definition of A, which can be either oxygen or sulfur. $R^4$ is a hydrocarbyl group as previously defined for the term "R".

The heat stabilizers encompassed by the present invention include compounds containing two different classes of anionic groups bonded to antimony or bismuth. This class of compounds is represented by the foregoing generic formula VI,

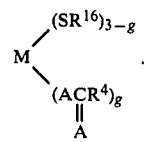

The definitions for A and $R^4$ are as previously defined for formula V, $R^{16}$ is hydrocarbyl as previously defined for R or $R^{16}$ can represent —$R^1COOR^2$ (viz. generic formula II) or —$R^3OZ$ (viz. generic formula III). The subscript "g" represents the integer 1 or 2.

In all of the foregoing formulae I–VI when one or more R, $R^1$, $R^2$, $R^3$, Z or $R^4$ groups are present on a molecule, these can be identical or different. Methods for preparing all of these compounds and the utility of these compounds as stabilizers for halogen-containing polymers are well known in the art, for example from the disclosures of U.S. Pat. Nos. 2,680,726; 2,684,956; 3,399,220; 3,466,261; 3,493,536; 2,161,024; 2,461,531; 2,556,420; 2,556,208; 2,801,988 and 3,530,158. The pertinent sections of the aforementioned patents are hereby incorporated by reference.

The following listing of specific antimony and bismuth compounds that fall within the scope of the present invention with respect to the heat stabilizing component indicates the variety of compounds and is not intended to limit the scope of the accompanying claims.

Antimony trisdodecylmercaptide
Bismuth trisdodecylmercaptide
Antimony trisphenylmercaptide
Bismuth trisphenylmercaptide
Antimony tribenzylmercaptide
Bismuth trisbenzylmercaptide
Antimony tris(2-hydroxyethyl mercaptide)
Bismuth tris(3-mercaptopropyl mercaptide)
Antimony tris(methyl mercaptopropionate)
Bismuth tris(butyl mercaptoacetate)
Antimony tris(isooctyl mercaptoacetate)
Bismuth tris(isodecyl mercaptopropionate)
Antimony tri(dodecyl mercaptopropionate)
Bismuth tris(octadecyl mercaptoacetate)
Antimony tris(benzyl mercaptoacetate)
Bismuth tris(allyl β-mercaptopropionate)
Antimony tris(octyl γ-mercaptobutyrate)
Bismuth tris(ethyl-γ-mercaptobutyrate)
Antimony tris(isopropyl δ-mercaptovalerate)
Bismuth tris(diamyl thiomalate)
Antimony tris(pentaerythrityl mercaptoacetate)
Bismuth tris(trimethylolpropane mercaptopropionate)
Antimony tris(thiobenzoate)
Bismuth tris(thiolaurate)
Antimony tris(caprylate)
Bismuth tris(stearate)
Antimony tris(oleate)
Bismuth tris(benzoate)
Antimony tris(methyl maleate)
Bismuth tris(butyl maleate)
Antimony tris(hexyl adipate)
Bismuth tris(octyl succinate)
Antimony tris(methyl azelate)
Bismuth tris(isooctyl fumarate)
Antimony tris(2-mercaptoethyl pelargonate)
Bismuth tris(2-mercaptoethyl caprylate)
Antimony tris(mercaptopropyl stearate)
Bismuth tris(1-thioglyceryl butyrate)
Antimony tris(2-mercaptopropyl butyl maleate)
Bismuth tris(2-mercaptopropyl methyl azelate)
Tetra[antimony]tris(pentaerythrityl tetramercapto acetate)
Antimony bis(dodecylmercaptide)stearate
Bismuth isooctyl mercaptoacetate bis(laurate)
n-butylantimony bis(dodecyl mercaptide)
Di-n-butylantimony dodecyl mercaptide
Diphenylbismuth dodecyl mercaptide
Diphenylantimony benzylmercaptide
Diallylantimony isooctylmercaptoacetate
Di-n-butylbismuth methylmercaptopropionate
Bis(antimony) tris(S,O-mercaptoacetate)
Bis(bismuth) tris(S,O-mercaptopropionate)
Antimony bis(dodecylmercaptoacetate)dodecylmercaptide
Bismuth bis(isooctylmercaptopropionate)cyclohexylmercaptide
Antimony methylmercaptopropionate dodecylmercaptide stearate Another class of compounds that can be employed as the heat stabilizer component of the present compositions are the bimetallic compounds containing antimony and tin that are disclosed in the U.S. Pat. No. 2,934,548; French Pat. No. 1,531,398; Japanese Pat. No. 72 06,106. Representative compounds within this class include [mono(dibutylin monooleate)mono(antimony-mono-2-ethylhexoate-mono-2-ethylhexyl mercaptoacetate)] sebacate and the compound represented by the formula

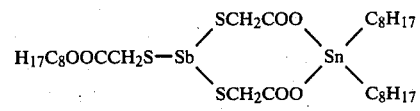

The second component of the present stabilizer compositions acts synergistically with the previously described heat stabilizer to impart unexpectedly high levels of heat stability to halogen-containing polymers such as polyvinyl chloride. The compounds constituting the second component are derivatives of diphenols wherein the two hydroxyl groups are located on adjacent carbon atoms of a phenyl or other aromatic carbocyclic ring structure and can be represented by one of the following three generic formulae.

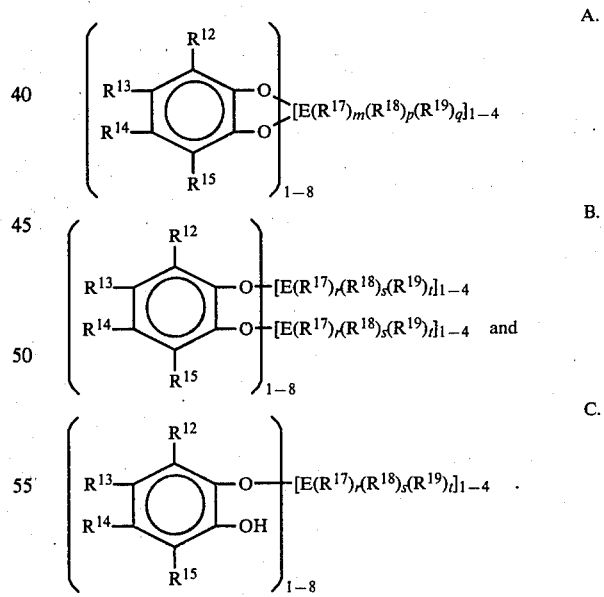

In the foregoing formulae A, B and C $R^{12}$, $R^{13}$, $R^{14}$ and $R^{15}$ can be identical or different and are selected from the group consisting of hydrogen, halogen, amine, nitro, nitroso, sulfonyl, hydroxymethylene (—$CH_2OH$), alkyl containing from 1 to 10 carbon atoms and aryl. Alternatively $R^{12}$ and $R^{13}$, $R^{13}$ and $R^{14}$ or $R^{14}$ and $R^{15}$ can be bonded together to form an aromatic or an alkyl-substituted aromatic ring structure such as phenyl or tolyl. The term "E" represents antimony, boron, silicon, phosphorus, zinc or tin. The subscripts m, p and q each represent integers from 0 to 2, with the proviso that the sum of m, p and q is 1 when E is antimony, boron or phosphorus; the sum of m, p and q is 2 when E is tin$^{IV}$ or silicon and m, p and q are all zero when E is tin$^{II}$ or zinc. The subscripts r, s and t each represent an integer from 0–3 with the proviso that the sum of these integers is 0 when E is zinc; this sum is 1 when E is tin$^{II}$; this sum is 2 when E is antimony, boron or phosphorus; and this sum is 3 when E is tin$^{IV}$ or silicon. The substituents on E, represented by $R^{17}$, $R^{18}$ and $R^{19}$ in the foregoing formulae A, B and C can be halogen or hydroxide, regardless of the element represented by E. When E is boron these substituents can additionally be selected from the group consisting of alkyl, aryl, alkaryl and aralkyl, wherein any alkyl group or alkyl portion of an alkaryl or aralkyl group contains from 1 to 10 carbon atoms, $R^{17}$, $R^{18}$ and $R^{19}$ can also represent mono- and polyfunctional alkoxy, mono- and polyfunctional aryloxy, $-SR^{16}$,

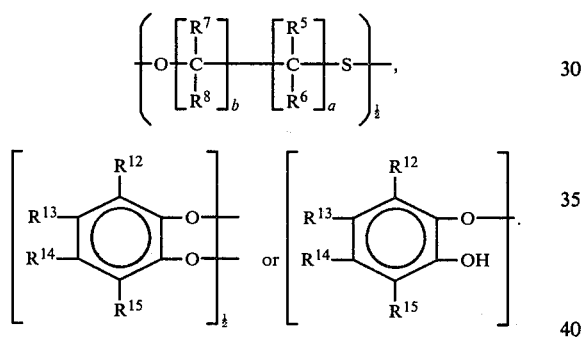

All of the terms in the three preceding formulae have previously been defined. Alternatively, if the sum of m, p and q or the sum of r, s and t is 2 or more, any two of $R^{17}$, $R^{18}$ and $R^{19}$ can collectively represent an oxygen atom.

When E is phosphorus, $R^{17}$, $R^{18}$ and $R^{19}$ can additionally be selected from alkoxide, aryloxide, siloxide [e.g., $-OSi(CH_3)_3$],

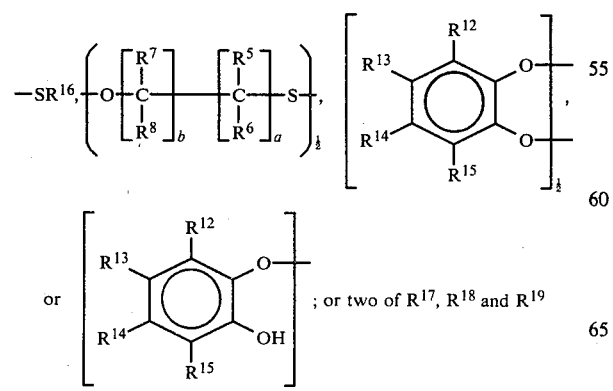

; or two of $R^{17}$, $R^{18}$ and $R^{19}$ can be combined to represent a doubly bonded oxygen or sulfur atom.

When E is silicon, $R^{17}$, $R^{18}$ and $R^{19}$ can additionally be selected from $-O-SiR^{20} R^{21} R^{22}$, where $R^{20}$, $R^{21}$ and $R^{22}$ are alkyl, aryl, alkaryl or aralkyl wherein any alkyl group or alkyl portion of an alkaryl or aralkyl group contains from 1 to 10 carbon atoms, $R^{20}$, $R^{21}$, $R^{22}$,

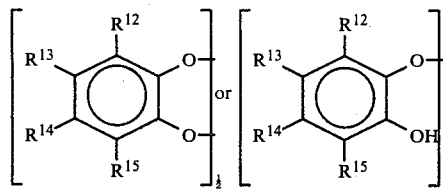

When E is antimony, $R^{17}$, $R^{18}$ and $R^{19}$ can additionally be selected from $R^{20}$, $-SR^{16}$, alkoxy, aryloxy,

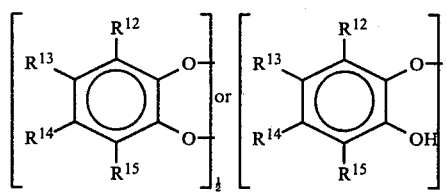

When E is tin$^{II}$, $R^{17}$, $R^{18}$ and $R^{19}$ can additionally be selected from the residue obtained by removal of a hydrogen atom from a saturated or ethylenically unsaturated, substituted or unsubstituted carboxylic acid of about 5 to 22 carbon atoms. When E is tin$^{IV}$, $R^{17}$, $R^{18}$ and $R^{19}$ can additionally be selected from alkyl, aryl, alkaryl and aralkyl, wherein any alkyl group or alkyl portion of an alkaryl group contains from 1 to 20 carbon atoms, $$-SR^{16}, -A\overset{A}{\overset{\|}{C}}R^4,$$

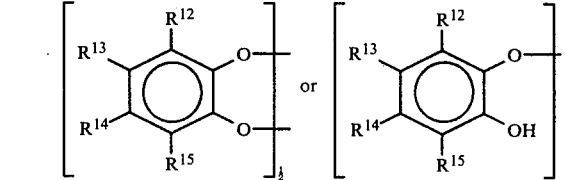

Specific derivatives of o-diphenols that can be combined with antimony or bismuth compounds to form the synergistic stabilizer compositions of this invention include, but are not limited to the following compounds:

| | |
|---|---|
| Tris(o-phenylene) bis(borate) | 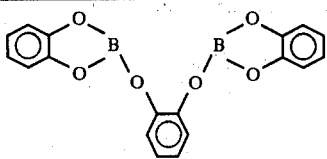 |
| Tris(t-butyl-o-phenylene) bis(phosphite) | 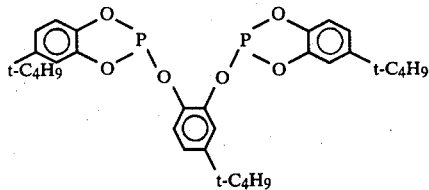 |
| Orthophenylene bis(benzodioxastibole) | 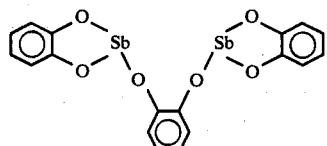 |
| Bis(o-phenylene)orthosilicate | 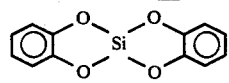 |
| Bis(o-phenylene)orthosilicate (as a polymer) | 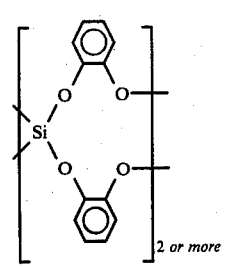 |
| Bis(o-phenylene)-stannate | 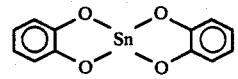 |
| 4-tert-butyl-o-phenylene pyroborate | 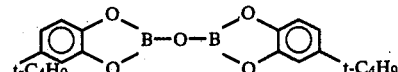 |
| Bis(o-phenylene)-bis(phosphite) anhydride | 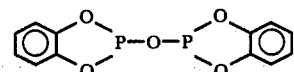 |
| Orthophenylene chloroborinate | 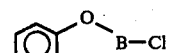 |
| 4-t-butyl-o-phenylene bromoborinate | 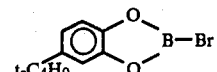 |
| Orthophenylene hydrogen borate | 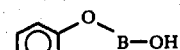 |
| Orthophenylene n-butyl borate | 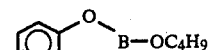 |
| S-n-octyl-4-t-butyl-o-phenylene thioborate | 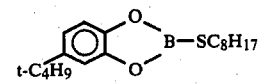 |
| 4-t-butyl-o-phenylene-dibutylaminoborinate | 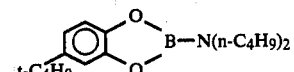 |
| Orthophenylene phenylboronate | 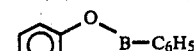 |
| 4-t-butyl-orthophenylene t-butylboronate | 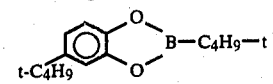 |

-continued

| | |
|---|---|
| Ortho-hydroxy-phenyl chloroborinate | 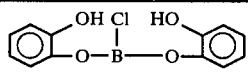 |
| Ortho-hydroxy-phenyl chloroborinate (as a polymer) | 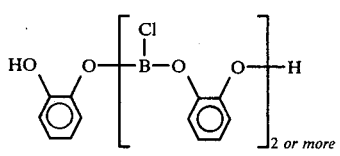 |
| [tert-butyl-1,2-benzene-diolato(2-)]tin (II) | 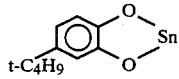 |
| [3,4,5,6-tetrabromo-1,2-benzene-diolato(2-)]tin (II) | 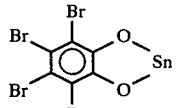 |
| [4-nitro-1,2-benzene-diolato(2-)]tin (II) | 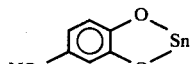 |
| [2-hydroxy-3-methoxy-phenolato(1-)]tin (II) | 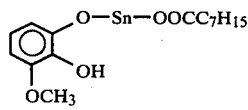 |
| 2-hydroxy-benzodioxastibole | 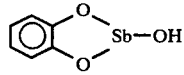 |
| 2-hydroxy-naphthodioxastibole | 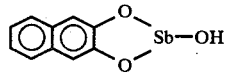 |
| 2-[di-n-butylhydroxy-ethylamino]4-t-butylbenzodioxa-stibole | 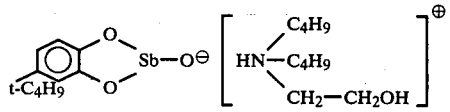 |
| 2-hydroxy-benzodioxa-stibole/n-propanol/ ammonia coordination compound | 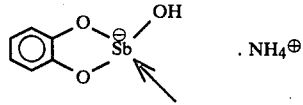 |
| 2-hydroxy-benzodioxa-stibole/glycerol/ diethylamine coordination compound | 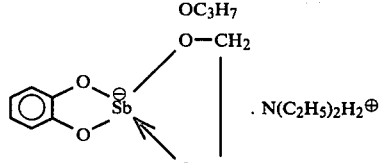 |
| 2-hydroxy-4-t-butyl-benzo-dioxastibole/ triethanol amine complex | 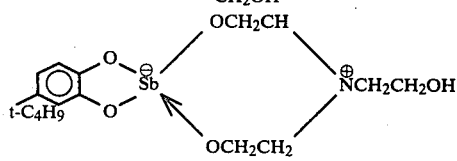 |
| Orthohydroxyphenyl phosphoric acid | 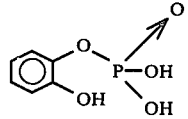 |
| Orthophenylene phosphoric acid | 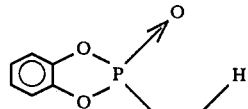 |
| 4-t-butyl-orthophenylene chlorophosphoric acid | 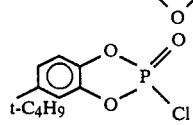 |

-continued

| | |
|---|---|
| Naphthalene-2,3-dioxy-phosphorus monochloride | 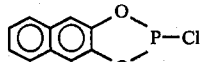 |
| Trimethylsilyloxy bis-o-phenylene-dioxyphosphorane | 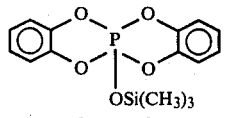 |
| Hydroxy bis-t-butyl-o-phenylene dioxyphosphorane | 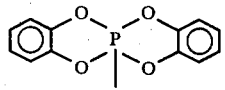 |
| o-hydroxyphenyl-o-phenylene phosphate | 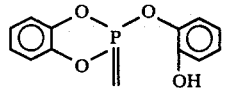 |
| t-butyl-o-phenylene-dioxy dibutylstannane | 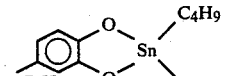 |
| o-phenylenedioxy bis tri-n-dodecylstannane | 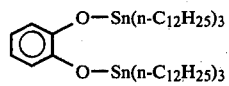 |
| t-butyl-o-phenylene-dioxy butylchlorostannane | 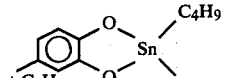 |
| Naphthalene 1-carbopropoxyethyl borate | 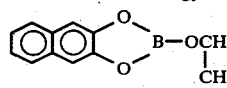 |
| Ethylene bis(4-methyl-o-phenylene) diborate | 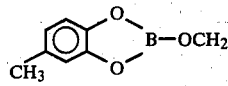 |
| o-phenylenedioxy phenylstibonate | 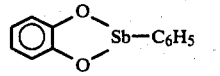 |
| 3-methylol-o-phenylene borate | 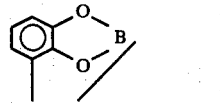 |
| 4-t-butyl-o-phenylenedioxy phosphorus trichloride | 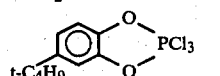 |
| 4-caproyl-o-phenylene octylborate | 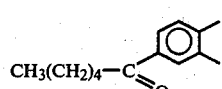 |
| o-phenylenedioxy diphenylsilane | 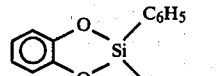 |
| o-phenylenedioxy diphenylsilane (as a polymer) | 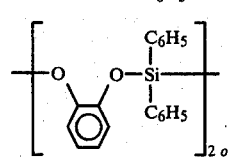 |
| 3,4,3',4'-diphenylenemethane di-2-ethylhexyl diborate | 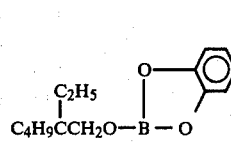 |
| Pyridine/phenyl-o-phenylene borate complex | 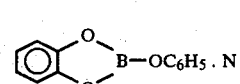 |

| -continued | |
|---|---|
| 1,3,2-benzodioxa-zincol | 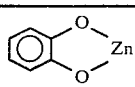 |

Ortho-substituted or ortho, ortho'-di-substituted aromatic ester or aryloxide compounds of boron, phosphorus, silicon, antimony, tin and zinc such as o-phenyleneorthosilicate, t-butyl-o-phenylene phosphite, o-phenylene-n-butyl-borate, 2,3-naphthalene borate anhydride, 2-hydroxybenzodioxastibole, [tert-butyl 1,2-benzenediolato(2-)]tin (II), o-phenylene-dioxy-di-n-butylstannane, and the like are the presently most preferred compounds of this invention for use in combination with antimony compounds as synergistic PVC stabilizers. Except for some meta, meta' di-substituted aromatic compounds, other aromatic ester or aryloxide compounds have not been presently found to provide synergistic thermal stabilization properties to polyvinylchloride.

For instance, based upon findings of synergisms and amounts of components were such synergisms might be found, most other seemingly chemically similar compounds do not display heat stabilizing synergisms with antimony organic sulfur and non-sulfur-containing compounds. In unexpected contrast, however, ortho-substituted and ortho, ortho'-di-substituted ester and aryloxide compounds as hereinbefore disclosed and the antimony or bismuth organic sulfur- and non-sulfur-containing components in combination, provide highly unexpected results. Such unexpected results along with other advantages are empirically demonstrated in numerous operating examples of this invention, and a further understanding thereof will become apparent in view of the detailed description herein.

The following detailed examples will serve to illustrate the principles of this invention in regard to its operating parameters, the types of specific materials which may be employed and their amounts used in typical poly(vinylchloride) resin formulations and particularly the synergistic effects shown by the essential combination of components in the stabilizer compositions according to this invention.

These examples are considered to be exemplary of this invention, and should not be considered as limiting, especially in view of the broad disclosure of principles of this invention.

The polyvinylchloride resin formulations used in the subsequent examples are typical of those used in commercial applications. The various combinations of organic antimony sulfur or non-sulfur containing compounds (Type I) and ortho-substituted or ortho, ortho'-disubstituted aromatic esters or aryloxides (Type II) were either first blended together to form storage-stable liquid or solid compositions and were then mixed into the PVC formulations or the Type I and Type II compounds were individually blended into the resin formulations according to the following examples on a parts by weight basis. All amounts of such stabilizer components, in the tables and examples, are on a parts (by weight) per hundred parts of resin basis, which is abbreviated as "phr."

The Type II compounds of this invention were incorporated in the stabilizer compositions on the basis of from 1 to 5 percent by weight of the antimony compound. However, up to about 10% or more can be used. At these usage levels liquid antimony and bismuth compounds of acceptable stability are formed. The presence of the Type II compounds imparts long term stability to the antimony and bismuth compounds in addition to increasing the efficacy of the antimony and bismuth compounds as stabilizers.

TABLE

| FORMULATIONS | 1 | 2 | 3 | 4 |
|---|---|---|---|---|
| Vinylchloride homopolymer (Diamond Shamrock PVC-450 or Tenneco 225-PG) | 100.0 | 100.0 | 100.0 | 100.0 |
| Titanium dioxide | — | 1.0 | 1.0 | 1.0 |
| Calcium carbonate coated with stearic acid | — | 3.0 | 2.5 | 3.0 |
| Calcium stearate | — | 0.5 | 0.6 | 0.5 |
| Paraffin wax (XL-165 from American Hoechst) | — | 1.1 | 0.5 | 1.0 |
| Paraffin wax (XL-200 from American Hoechst) | 0.5 | — | — | — |
| Oxidized polyethylene wax (AC-629A from Allied Chemical Corp.) | — | 0.15 | — | 0.15 |
| Acrylic Processing Aid (Acryloid K-120N from Rohm & Haas Co.) | 2.0 | — | — | — |
| Stabilizer | as indicated | | | |

The heat stability of the various formulations with and without additives was evaluated by milling the formulation for five (5) minutes at 163° C. to form a homogeneous composition, removing the resultant product in the form of a coherent sheet and allowing it to harden by cooling it to ambient temperature on a flat surface. The sheets formed in this manner were cut into squares measuring 1×1 inch (2.5×2.5 cm.) and placed on trays. The rays were placed in a forced air oven at a temperature of 204° C. Test samples were removed from the oven at pre-selected time intervals. A record of heat stability, or color development with time, was obtained by assigning color ratings to each sample. In this manner early color development and long-term heat stability properties for any stabilizer composition or components thereof are readily ascertained.

A second method for evaluating stabilizer compositions or individual components thereof comprised forming compression molded plaques by placing pieces of the aforementioned milled sheets side-by-side in a metal frame between highly polished chrome plated steel plates. This composite was then placed between the platens of a hydraulic press maintained at a temperature of about 177° C. and subjected to about 18,000 kilograms ram pressure for about ten (10) minutes. The color of the resultant compression molded products was then rated either visually or by use of a colorimeter to measure Yellowness Index (Y.I.) values. These values were determined using a Meeco Colormaster Tristimulus Differential Colorimeter to measure the reflectance of green, red and blue light from the surface of the sample. The Y.I. value was then calculated using the equation:

$$Y.I. = \frac{\text{Red value} - \text{Blue value}}{\text{Green value}} \times 100$$

EXAMPLES 1-8

The synergistic response of the combination of several ortho, ortho'-disubstituted aromatic ester compounds and antimony tris(isooctylmercaptoacetate) is clearly demonstrated in Examples 1-8.

In these examples the stabilizer combinations, as well as the individual components thereof, were intimately blended into the resin formulation by milling them at 163° C. and oven tested for heat stability at 204° C. Table 2 summarizes the results.

The stabilizer components and combinations thereof employed in all of the examples in this specification are identified by numbers as follows:

| Component Number | Identification |
|---|---|
| 1 | Antimony tris(isooctylmercaptoacetate) |
| 2 | No. 1, diluted to about 11% antimony with mineral oil |
| 3 | Antimony tris(n-butylmercaptoacetate), diluted to about 11% antimony |
| 4 | Antimony tris(pentaerythrityl-monocaprylate-monomercaptoacetate) |
| 5 | Antimony tris(2-hydroxyethylmercaptide), diluted to about 11% antimony with a non-reactive polar solvent |
| 6 | Antimony trioleate |
| 7 | 4-t-butyl-o-phenylene pyroborate |
| 8 | No. 1, diluted to about 11% antimony, and containing 4% by weight of No. 7 |
| 9 | Tris(o-phenylene) bis(phosphite) |
| 10 | No. 1, diluted to about 11% antimony, and containing 4% by weight of No. 9 |
| 11 | Tris(o-phenylene) bis borate |
| 12 | No. 1, diluted to about 11% antimony, and containing 4% by weight of No. 11 |
| 13 | Bis(o-phenylene)orthosilicate |
| 14 | No. 1, diluted to about 11% antimony, and containing 4% by weight of No. 13 |
| 15 | No. 1, diluted to about 11% antimony, and containing 1% by weight of No. 9 |
| 16 | No. 1, diluted to about 11% antimony, and containing 1% by weight of No. 11 |
| 17 | No. 1, diluted to about 11% antimony, and containing 1% by weight of No. 13 |
| 18 | o-Phenylene-n-butylborate |
| 19 | No. 1, diluted to about 11% antimony, and containing 4% by weight of No. 18 |
| 20 | o-Phenylenepyroborate |
| 21 | No. 1, diluted to about 11% antimony, and containing 4% by weight of No. 20 |
| 22 | No. 4 containing 3% by weight of No. 18 |
| 23 | A commercial, diluted antimony tris(issoctyl-mercaptoacetate) product covered by U.S. Patent 4,029,618 |
| 24 | 2-Hydroxybenzodioxastibole |
| 25 | No. 1, diluted to about 11% antimony, and containing 4% by weight of No. 24 |
| 26 | 4-t-butyl-o-phenylenedioxydibutylstannane |
| 27 | No. 1, diluted to about 11% antimony, and containing 4% by weight of No. 26 |
| 28 | Bismuth tris(isooctylmercaptoacetate), diluted to about 11% bismuth |
| 29 | No. 28 containing 4% by weight of No. 18 |
| 30 | Bismuth tris(n-dodecylmercaptide), diluted to about 11% bismuth |
| 31 | No. 30 containing 4% by weight of No. 18 |
| 32 | Antimony tris(n-dodecylmercaptide), diluted to about 11% antimony |
| 33 | No. 32 containing 4% by weight of No. 9 |
| 34 | Antimony tris(2-mercaptoethylcaprylate), diluted to about 11% antimony |
| 35 | No. 34 containing 4% by weight of No. 13 |
| 36 | No. 6 containing 5% by weight of No. 18 |
| 37 | No. 5 containing 4% by weight of No. 18 |
| 38 | No. 3 containing 4% by weight of No. 18 |

TABLE 2

(Formulation 1)[b]

| | | | Color Development[a] with Time (in minutes) at 204° C. | | | | | |
|---|---|---|---|---|---|---|---|---|
| | Component Number | PHR | Initial | 5 | 10 | 15 | 20 | 25 |
| Example 1 | No additive | — | 4− | 3+ | 3 | 2 | 1 | 1 |
| Example 2 | 1 | 0.95 | 7− | 6+ | 6− | 5 | 2 | 1 |
| Example 3 | 18 | 0.05 | 4+ | 4 | 3 | 2 | 1 | 1 |
| Example 4 | 1 / 18 | 0.95 / 0.05 | 7 | 7− | 7− | 6− | 2 | 1 |
| Example 5 | 9 | 0.05 | 4+ | 4 | 3 | 2 | 1 | 1 |
| Example 6 | 1 / 9 | 0.95 / 0.05 | 7 | 7− | 6+ | 5 | 2 | 1 |
| Example 7 | 13 | 0.05 | 4 | 3+ | 3 | 2 | 1 | 1 |
| Example 8 | 1 / 13 | 0.95 / 0.05 | 7 | 7 | 7− | 6 | 4 | 1 |

[a]Color Scale:
7 = clear, water-white
5 = light yellow
3 = orange to red-brown
1 = very dark red-brown to black
[b]Refer to Table 1 for formulation Table 2 contains data which show that the use of 0.05 phr of each of the present Type II compounds in the absence of a Type I antimony or bismuth compound does not significantly improve the inherently poor stability of the polyvinyl chloride resin. Antimony tris(isooctylmercaptoacetate) alone, however, at 0.95 phr was found to impart significant heat stability to the PVC Formulation. The fact that the Type II compounds each at 0.05 phr when combined with antimony tris(isooctylmercaptoacetate) at 0.95 phr further improved both the short- and long-term stability of the PVC resin demonstrates a synergistic response considering the poor stabilizing efficacy of the Type II compounds.

EXAMPLES 9-18

The synergistic improvements demonstrated in Examples 1-8 are corroborated by the visual and colorimetric ratings for compression molded plaques prepared from the milled sheets of Examples 1-8. The sheets were molded at 177° C. for ten (10) minutes. Examples 17 and 18 additionally demonstrate the synergistic response for the combination of bismuth tris(isooctylmercaptoacetate) and a typical Type II compound.

TABLE 3

(Formulation 1)[a]

| | | | Color Development on Compression Molding 10 Minutes at 177° C. | |
|---|---|---|---|---|
| | Component Number | PHR | Visual Rating | Yellowness Index |
| Example 9 | no additive | — | 2 | 188.1 |
| Example 10 | 1 | 0.95 | 6 | 13.4 |
| Example 11 | 18 | 0.05 | 3 | 155.3 |
| Example 12 | 1 / 18 | 0.95 / 0.05 | 7 | 5.2 |
| Example 13 | 9 | 0.05 | 3 | 133.0 |
| Example 14 | 1 / 9 | 0.95 / 0.05 | 6+ | 11.7 |
| Example 15 | 13 | 0.05 | 2 | 184.5 |
| Example 16 | 1 / 13 | 0.95 / 0.05 | 7 | 10.3 |

TABLE 3-continued (Formulation 1)[a]

|  | Component Number | PHR | Color Development on Compression Molding 10 Minutes at 177° C. Visual Rating | Yellowness Index |
|---|---|---|---|---|
| Example 17 | 28 | 0.95 | 4− | 79.3 |
| Example 18 | 28 | 0.95 | 5− | 43.1 |
|  | 18 | 0.05 |  |  |

[a]Refer to Table 1 for formulation

EXAMPLES 19–56

Table 4 exemplifies the synergistic improvement in heat stability by numerous additional antimony and bismuth organic sulfur-and non-sulfur-containing compounds in combination with aromatic esters and aryloxides typical of this invention.

In these examples the Type II compounds were blended with antimony tris(isooctylmercaptoacetate) prior to addition of the combination of components to the PVC formulations. Since the synergistists are generally used in relatively minor amounts, they are most preferably pre-blended with the antimony or bismuth compound rather than separately added to the resin formulation. For instance, the stabilizer of Example 29 is employed at a concentration of 0.35 phr, which consists of 0.3465 phr of antimony compound and only 0.0035 phr of synergist. Optimum blending homogeneity is therefore best obtained by pre-blending the stabilizer components. Furthermore, the presence of the Type II compound significantly improves the storage stability of the antimony or bismuth compound. Thus, the pre-blended stabilizer compositions of this invention and the components thereof were intimately incorporated into the resin formulations by two-roll milling for five (5) minutes at 163° C. The resultant PVC sheets were then compression molded into plaques to test them for heat stability as previously described. Examples 19–29 clearly demonstrate the poor PVC stabilization efficacy of the Type II synergists alone. The visual and colorimetric ratings for each of the combinations versus the ratings for antimony tris(isooctylmercaptoacetate) alone shows the superior performance of the combinations, even at very low synergist levels. These results are quite unexpected by virtue of the fact that the color ratings of the Type II compounds alone are poorer than that of the antimony compound alone. The Type II compounds would therefore not be expected to contribute to the heat stability of the PVC resin composition.

Examples 30–40 show the diversity of synergistic Type II compounds of this invention which can be used in combination with antimony and bismuth compounds of Type I. The color values for these combinations show unexpected superiority over the individual components of the combinations. In Examples 41–56 the heat stability imparted to PVC resin by a wide variety of antimony and bismuth sulfur- and non-sulfur-containing compounds is shown to be synergistically improved in much the same way as the compositions of Examples 19–29.

TABLE 4

|  | Component Number | PHR | Color Development on Compression Molding 10 minutes at 177° C. Visual Rating[b] | Yellowness Index |
|---|---|---|---|---|
| (Formulation 2)[a] | | | | |
| Example 19 | no additive | — | 1 | 43.2 |
| Example 20 | 2 | 0.35 | 5 | 22.7 |
| Example 21 | 11 | 0.05 | 2+ | 37.1 |
| Example 22 | 12 | 0.35 | 7− | 15.4 |
| Example 23 | 16 | 0.35 | 5+ | 20.2 |
| Example 24 | 9 | 0.05 | 2 | 32.8 |
| Example 25 | 10 | 0.35 | 6+ | 14.7 |
| Example 26 | 15 | 0.35 | 5+ | 20.0 |
| Example 27 | 13 | 0.05 | 2− | 31.2 |
| Example 28 | 14 | 0.35 | 7− | 15.3 |
| Example 29 | 17 | 0.35 | 5+ | 19.6 |
| (Formulation 4)[a] | | | | |
| Example 30 | 2 | 0.4 | 5+ | 20.0 |
| Example 31 | 18 | 0.05 | 3 | 38.8 |
| Example 32 | 19 | 0.4 | 7 | 9.4 |
| Example 33 | 20 | 0.05 | 3 | 47.9 |
| Example 34 | 21 | 0.4 | 7 | 9.6 |
| Example 35 | 24 | 0.05 | 4 | 35.0 |
| Example 36 | 25 | 0.4 | 7 | 6.4 |
| Example 37 | 7 | 0.05 | 3 | 45.0 |
| Example 38 | 8 | 0.4 | 7 | 9.9 |
| Example 39 | 26 | 0.05 | 3 | 43.0 |
| Example 40 | 27 | 0.4 | 6 | 8.5 |
| Example 41 | 28 | 0.4 | 5 | 16.6 |
| Example 42 | 29 | 0.4 | 6 | 13.1 |
| Example 43 | 32 | 0.4 | 3+ | 37.0 |
| Example 44 | 33 | 0.4 | 5− | 25.8 |
| Example 45 | 34 | 0.4 | 5 | 16.1 |
| Example 46 | 35 | 0.4 | 7− | 9.3 |
| Example 47 | 6 | 0.4 | 2 | 29.0 |
| Example 48 | 36 | 0.4 | 4 | 19.9 |
| Example 49 | 5 | 0.4 | 5+ | 19.0 |
| Example 50 | 37 | 0.4 | 7 | 7.9 |
| Example 51 | 3 | 0.4 | 6 | 19.7 |
| Example 52 | 38 | 0.4 | 7 | 8.8 |
| Example 53 | 4 | 0.5 | 5 | 20.4 |
| Example 54 | 22 | 0.5 | 6 | 15.1 |
| Example 55 | 30 | 0.4 | 2 | 33.7 |
| Example 56 | 31 | 0.4 | 4 | 12.0 |

[a]Refer to Table 1 for formulation
[b]Color Scale:
7 = White to Gray White
5 = Yellow-White to Tan-White
3 = Tan to Gray
1 = Dark Tan to dark Gray to dark Grayish Pink

EXAMPLES 57–60

The data for examples 57–60, summarized in Table 5, demonstrate the synergism achieved by combining antimony tris(isooctylmercaptoacetate) with Type II compounds over a wide range of antimony concentration (20 milligrams to about 160 milligrams antimony metal per hundred grams of polyvinylchloride resin). A synergistic response is achieved for combinations of components beyond the range demonstrated in the following table:

TABLE 5

(Formulation 4)

|  | Component Number | PHR | Milligrams antimony | Color Development on Compression Molding 10 minutes at 177° C. Visual Rating[b] | Y.I. |
|---|---|---|---|---|---|
| Example 57 | 1 | 0.95 | 158 | 6 | 7.0 |
| Example 58 | 1 | 0.95 | 155 | 7 | 6.3 |
|  | 18 | 0.05 | | | |

TABLE 5-continued (Formulation 4)

|  | Component Number | PHR | Milligrams antimony | Color Development on Compression Molding 10 minutes at 177° C. | |
|---|---|---|---|---|---|
|  |  |  |  | Visual Rating[b] | Y.I. |
| Example 59 | 2 | 0.2 | 21 | 4 | 21.4 |
| Example 60 | 19 | 0.2 | 20 | 6 | 14.2 |

EXAMPLES 61–63

Table 6 provides further evidence for the synergistic stabilization response exhibited by a combination of Type I and Type II compounds—which includes markedly improved early color and long-term stability, as determined by oven heat stability evaluation of a typical PVC pipe compound.

TABLE 6

(Formulation 4)

|  | Component Number | PHR | Color Development[b] with Time (in minutes) at 204° C. | | | | | |
|---|---|---|---|---|---|---|---|---|
|  |  |  | Initial | 4 | 8 | 12 | 16 | 20 | 24 |
| Example 61 | 2 | 0.40 | 6 | 6 | 6— | 5 | 2+ | 2 | 1 |
| Example 62 | 18 | 0.05 | 4 | 3 | 3 | 3 | 2 | 2 | 1 |
| Example 63 | 19 | 0.40 | 7 | 7 | 7 | 7— | 2+ | 2+ | 2 |

EXAMPLES 64–66

Improved shelf-stability of the liquid combination of components of this invention in comparison to an antimony compound alone is demonstrated using data obtained by exposure of these materials, contained in flint glass vessels, to fluorescent light and incident sunlight upon standing on a laboratory bench over a period of time. The superiority of a combination of components of this invention over a commercially available antimony stabilizer composition of the closest prior art is likewise shown in Table 7. Additionally, Examples 64–66 clearly show improved ultra-violet light stability of the liquid combination of components of this invention compared to an antimony compound alone and also superior ultra-violet light stability of a product of this invention versus the closest prior art stabilizer. This latter evidence was obtained by exposure of the example's components, contained in flint glass vessels, to Germicidal (RS) Sunlamps. The formation of solid precipitates in Examples 64 and 66 and the lack of solids forming in Example 65 supports the additional principles of this invention.

TABLE 7

| Component Number |  | Exposure to Germicidal (RS) Sunlamps | | | Exposure to fluorescent & Incident sunlight | |
|---|---|---|---|---|---|---|
|  |  | Initial | 1 Hr. | 2 Hrs. | Initial | 2 Weeks |
| Example 64 | 2 | Clear & colorless | White & brown ppt. | Voluminous ppt. | Clear & colorless | Voluminous white ppt. |
| Example 65 | 19 | Clear & colorless | No solids | No solids | Clear & colorless | Clear & colorless |
| Example 66 | 23 | Clear & colorless | Very Sl. brown ppt. | Sl. brown ppt. | Clear & colorless | Yellow with sl. brown |

TABLE 7-continued

| Component Number |  | Exposure to Germicidal (RS) Sunlamps | | | Exposure to fluorescent & Incident sunlight | |
|---|---|---|---|---|---|---|
|  |  | Initial | 1 Hr. | 2 Hrs. | Initial | 2 Weeks |
|  |  |  |  |  |  | ppt. |

EXAMPLES 67–68

Other evidence of the superiority of compositions of this invention over the closest prior art stabilizer comes from exposure of PVC formulations containing these stabilizers to Fluorescent Sunlamp-Black Light (FS-BL). For these examples, stabilizer components were two-roll milled into polyvinylchloride resin formulations for five (5) minutes at 177° C. and finally, exposure of the molded plaques in the FS-BL equipment. The Yellowness Index measurements of the plaques which were made initially, before exposure to the ultra-violet light source and following exposure for 100 hours are listed in Table 8. In addition to the superior ultra-violet light protection that combinations of components of this invention provide to PVC formulations, in comparison to closest prior art stabilizers, superior early color properties are also demonstrated.

TABLE 8

(Formulation 3)[a]

|  | Component Number | PHR | Yellowness Index with Time (in hours) on FS-BL Exposure | |
|---|---|---|---|---|
|  |  |  | Initial(0) | 100 |
| Example 67 | 12 | 0.4 | 13.1 | 19.2 |
| Example 68 | 23 | 0.4 | 19.3 | 22.7 |

[a]Refer to Table 1 for formulations

EXAMPLES 69–70

Examples 69–70, shown in Table 9, demonstrate the superior resistance to color degradation on heating under pressure that a stabilizer mixture of this invention has compared to a closes prior-art stabilizer. Sheets formed after two-roll milling PVC formulations containing the exemplified products for five (5) minutes at 163° C. were then converted into three (3) compression molded plaques by heating at 177° C. for 10, 15 and 25 minutes, respectively. The Yellowness Index determined for these moldings show the product of this invention to have superior resistance to thermally induced color degradation.

TABLE 9

(Formulation 3)

|  | Component Number | PHR | Color Development with Time (in minutes) on Compression Molding @ 177° C. | | |
|---|---|---|---|---|---|
|  |  |  | 10 | 15 | 25 |
| Example 69 | 19 | 0.4 | 17.1 | 19.0 | 23.2 |

TABLE 9-continued

| | | (Formulation 3) | | |
| | | Color Development with Time (in minutes) on | | |
| Component | | Compression Molding @ 177° C. | | |
| Number | PHR | 10 | 15 | 25 |
| Example 70 | 23 | 0.4 | 20.9 | 22.0 | 26.5 |

EXAMPLES 71–73

The improvement in resistance to ultra-violet light induced discoloration for combinations of components of this invention over the antimony compound alone is shown by Examples 71–73 in Table 10. In this case, the exemplified components were intimately incorporated into a PVC formulation by two-roll milling into sheets. The sheets were then compression molded for five (5) minutes at 177° C. into plaques and the plaques, in turn, were subjected to the effects of ultraviolet radiation in the FS-BL apparatus over an extended period of time. Yellowness Index values were determined for each pressed sheet prior to U.V. exposure and periodically after exposure. The superiority of products of this invention is clearly demonstrated.

TABLE 10

| | | (Formulation 4) | | | |
| | | Yellowness Index with Time | | | |
| Component | | (in hours) on FS-BL Exposure | | | |
| Number | PHR | Initial | 100 | 200 | 300 |
| Example 71 | 2 | 0.4 | 11.2 | 16.0 | 22.1 | 30.1 |
| Example 72 | 12 | 0.4 | 7.1 | 13.5 | 20.2 | 28.5 |
| Example 73 | 19 | 0.4 | 8.0 | 13.8 | 19.7 | 26.8 |

EXAMPLES 74–77

The following examples show the applicability of the compositions of this invention in providing extruded PVC pipe of superior color to that made with the antimony compound alone. As an added benefit, lower extruder head pressures are found to result when this invention is employed. Evaluation of several combinations of components of this invention in a typical PVC pipe formulation was accomplished by first blending all the ingredients in a Henschel high-intensity mixer. The resulting dry-blends were then extruded in a Modern Plastics Machinery Corporation Type 150-24LH extruder with a 1½" (3.8 cm) screw, in conjunction with a 2.5 cm. pipe die. The data from these extrusions, listed in Table 11, in comparison to the results found for the antimony compound alone are clearly demonstrative of the principles of this invention.

TABLE 11

| | | (Formulation 2) | |
| Component Number | PHR | Pipe Color Rating$^{(b)}$ | Extruder Head Pressure |
| Example 74 | 2 | 0.4 | 6− | 2100–2200 psi (1.47 × $10^5$–1.55 × $10^5$ g/cm$^2$) |
| Example 75 | 12 | 0.4 | 7 | 1600–1700 psi (1.12 × $10^5$–1.2 × $10^5$ g/cm$^2$) |
| Example 76 | 19 | 0.4 | 7 | 1500 psi (1.05 × $10^5$ g/cm$^2$) |
| Example 77 | 14 | 0.4 | 7 | 1100 psi (0.77 × $10^5$ g/cm$^2$) |

EXAMPLES 78–80

Similar synergistic heat and light stabilizing principles of this invention can be demonstrated when antimony tris(n-dodecylmercaptoacetate), antimony bis-(isooctylmercaptoacetate)mono-n-dodecylmercaptide, or bis(antimony) tris (glycoldimercaptopropionate) are substituted for the antimony or bismuth organic sulfur- or non-sulfur-containing compounds of the preceding examples and similar procedures employed.

While the halogenated hydrocarbon resins which were employed in the above examples were vinyl chloride homopolymers, it is to be understood that the scope of this invention is not to be limited to a particular vinly halide polymer such as polyvinyl chloride. Many other halogenated hydrocarbon resins can be used to illustrate the principles of this invention. Specific examples include polyvinylidene chloride, chlorinated polyvinylchloride, polyvinylbromide, polyvinyl fluoride, chlorinated polyethylene and co-polymer resins predominatly containing polymerized vinyl chloride along with smaller amounts of other co-polymerized monomers such as ethylene, propylene, butylene, vinyl acetate, vinyl ethers, vinyl alcohol, vinylidene chloride, styrene, acrylate esters, and the like.

Halogenated resin compositions other than the aforementioned Formulations 1–4 can be used to illustrate the principles of this invention. It is, therefore, also to be understood that a large variety of other resin additives such as plasticizers, fillers, lubricants, impact modifiers, processing aids, pigments, colorants, flame retardants, other stabilizers, etc., may be incorporated in the polymer formulations to derive the benefits of the stabilizer compositions of this invention.

What is claimed is:

1. A vinyl halide resin composition comprising a vinyl chloride resin, an effective amount of a heat stabilizer for said resin and a synergistically effective amount of a synergist for said heat stabilizer, wherein the heat stabilizer exhibits the general formula $MX_3$ wherein M is antimony or bismuth and X represents the residue obtained by removing (1) the hydrogen atom from a carboxy (—COOH) group of a mono- or polycarboxylic acid or (2) the hydrogen atom from the sulfur atom of a mercaptan, mercaptoacid ester or mercaptoalkanol ester, and the synergist exhibits a general formula selected from the group consisting of

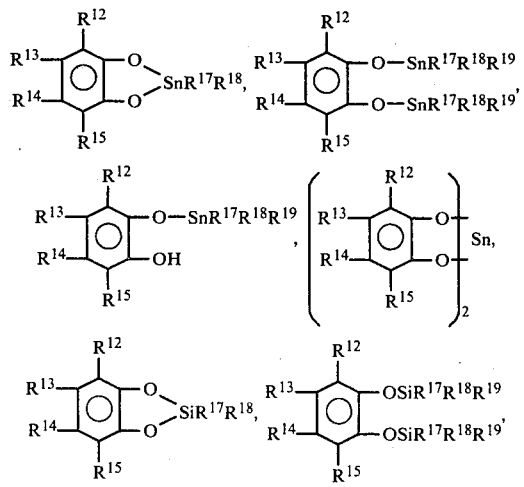

-continued

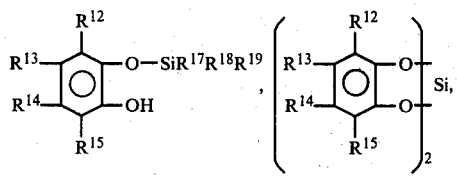
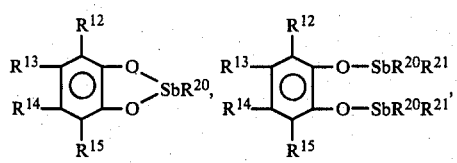
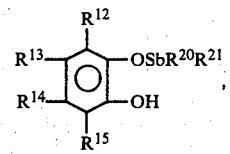
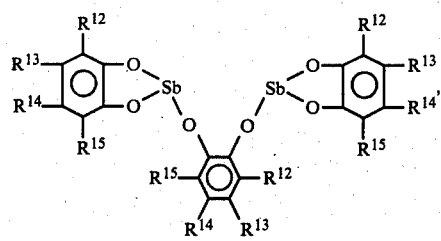
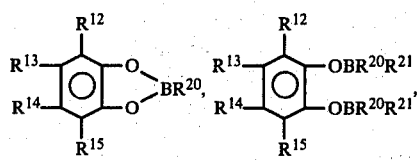
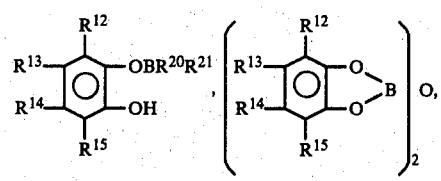
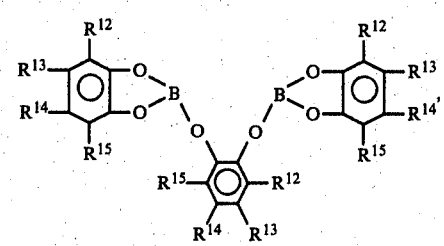
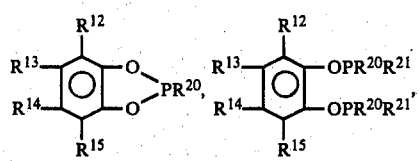
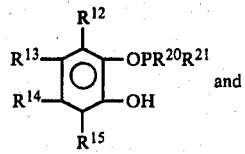 and

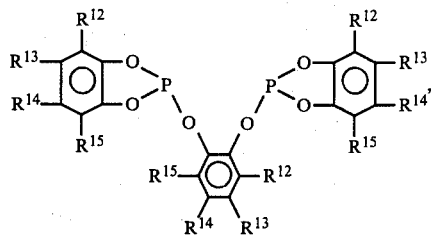

wherein $R^{12}$, $R^{13}$, $R^{14}$ and $R^{15}$ are individually selected from the group consisting of hydrogen, halogen, amine, nitro, nitroso, sulfonyl, hydroxymethylene, alkyl containing from 1 to 20 carbon atoms and aryl, $R^{17}$, $R^{18}$ and $R^{19}$ are individually selected from the group consisting of alkyl, aryl, alkaryl and aralkyl wherein any alkyl group or the alkyl portion of any alkaryl or aralkyl group contains from 1 to 20 carbon atoms, and $R^{20}$ and $R^{21}$ are individually selected from the group consisting of hydroxyl, alkoxy and aryloxy.

2. A vinyl halide resin composition according to claim 1 wherein said heat stabilizer exhibits a formula selected from the group consisting of $M(SR)_3$, $M(SR^1COOR^2)_3$, $M(SR^3OZ)_3$ and $M(OOCR^4)_3$ wherein R represents hydrocarbyl or hydroxyalkyl, each of which contains from 1 to 20 carbon atoms, $R^1$ is alkylene, arylene or aralkylene wherein any alkylene group or alkylene portion of n aralkylene group contains from 1 to 20 carbon atoms, $R^2$ represents substituted or unsubstituted alkyl, aryl or aralkyl, $R^3$ is

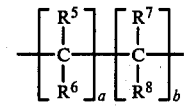

wherein $R^5$, $R^6$, $R^7$ and $R^8$ are hydrogen and a and b each represent an integer from 1 to 20, M is antimony or bismuth, $R^4$ represents hydrocarbyl and Z represents a hydrogen atom or the residue remaining following removal of the hydroxyl portion of the carboxy (—COOH) group of a monocarboxylic acid or one carboxy group of a dicarboxylic acid, wherein Z contains from 1 to 20 carbon atoms.

3. A vinyl halide resin composition according to claim 2 wherein R represents alkyl containing from 1 to 20 carbon atoms.

4. A vinyl halide resin composition according to claim 2 wherein $R^1$ is methylene or ethylene and $R^2$ is alkyl containing from 1 to 20 carbon atoms.

5. A vinyl halide resin composition according to claim 2 wherein $R^3$ is ethylene.

6. A vinyl halide resin composition according to claim 2 wherein $R^2$ is

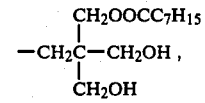

and $R^1$ is methylene.

7. A vinyl halide resin composition according to claim 1 wherein said synergist is selected from the group consisting of
tris(t-butyl-o-phenylene) bis(phosphite)

o-phenylene bis(benzodioxastibole)
bis(o-phenylene)orthosilicate
bis(o-phenylene)orthosilicate (as a polymer)
bis(o-phenylene)stannate
tris(o-phenylene)bis(borate)
4-tert-butyl-o-phenylene pyroborate
bis(o-phenylene) bis(phosphite)anhydride
o-phenylene chloroborinate
4-t-butyl-o-phenylene bromoborinate
o-phenylene hydrogen borate
o-phenylene n-butyl borate
S-n-octyl-4-t-butyl-o-phenylene thioborate
4-t-butyl-o-phenylenedibutylaminoborinate
o-phenylene phenylboronate
4-t-butyl-orthophenylene t-butylboronate
o-hydroxyphenyl chloroborinate
o-hydroxyphenyl phosphoric acid
o-phenylene phosphoric acid
4-t-butyl-o-phenylene chlorophosphoric acid
o-hydroxyphenyl chloroborinate (as a polymer)
[tert-butyl-1,2-benzenediolato(2-)] tin (II)
[3,4,5,6-tetrabromo-1,2-benzenediolato(2-)] tin (II)
[4-nitro-1,2-benzenediolato(2-)] tin (II)
[2-hydroxy-3-methoxyphenolato(1-)] tin (II)
2-hydroxy-benzodioxastibole
napthalene-2,3-dioxyphosphorus monochloride
trimethylsilyloxy bis-o-phenylene-dioxyphosphorane
2-hydroxy-naphthodioxastibole
2-[di-n-butylhydroxyethylamino] 4-t-butylbenzodioxastibole
2-hydroxy-benzodioxastibole/n-propanol/ammonia coordination compound
2-hydroxy-benzodioxastibole/glycerol/diethylamine coordination compound
2-hydroxy-4-t-butyl-benzodioxastibole/triethanol amine complex
hydroxy bis-t-butyl-o-phenylene dioxyphosphorane
o-hydroxyphenyl-o-phenylene phosphate
t-butyl-o-phenylene-dioxydibutylstannane
o-phenylenedioxy bis tri-n-dodecylstannane
t-butyl-o-phenylene-dioxy butylchlorostannane
naphthalene 1-carbopropoxyethyl borate
ethylene bis(4-methyl-o-phenylene) diborate
o-phenylenedioxy phenylstibonate
3-methylol-o-phenylene borate
4-t-butyl-o-phenylenedioxy phosphorus trichloride
4-caproyl-o-phenylene octylborate
o-phenylenedioxy diphenylsilane
o-phenylenedioxy diphenylsilane (as a polymer)
3,4,3',4'-diphenylene-methane di-2-ethylhexyl diborate
pyridine/phenyl-o-phenylene borate complex
and
1,3,2-benzodioxazincol.

8. A vinyl halide resin composition according to claim 1 wherein the combination of said heat stabilizer and said synergist is liquid and shelf-stable at ambient temperatures.

9. A vinyl halide resin composition according to claim 1 wherein said antimony compound is selected from the group consisting of
antimony tris(isooctylmercaptoacetate)
antimony tris(isooctylmercaptopropionate)
antimony tris(n-dodecylmercaptide)
antimony tris(2-hydroxyethylmercaptide)
antimony tris(3-hydroxypropylmercaptide)
antimony tris(methylmercaptoacetate)
antimony tris(butylmercaptoacetate)
antimony tris(octadecylmercaptoacetate)
antimony tris(2-mercaptoethylcaprylate)
antimony tris(3-mercaptopropylstearate)
antimony tris(pentaerythrityl-monocaprylate-monomercaptoacetate)
antimony tri oleate
antimony n-dodecylmercaptide bis(isooctylmercaptoacetate)
bis(antimony) tris(glycoldimercaptoacetate) and mixtures thereof.

10. A vinyl halide resin composition according to claim 1 wherein said bismuth compound is selected from the group consisting of
bismuth (isooctylmercaptoacetate)$_3$
bismuth (isooctylmercaptopropionate)$_3$
bismuth (n-dodecylmercaptide)$_3$
bismuth (2-hydroxyethylmercaptide)$_3$
bismuth (3-hydroxypropylmercaptide)$_3$
bismuth (methylmercaptoacetate)$_3$
bismuth (butylmercaptoacetate)$_3$
bismuth (octadecylmercaptoacetate)$_3$
bismuth (2-mercaptoethylcaprylate)$_3$
bismuth (3-mercaptopropylstearate)$_3$
bismuth pentaerythrityl-monocaprylate-monomercaptoacetate
bismuth tri oleate
bismuth n-dodecylmercaptide bis(isooctylmercaptoacetate)
bis(bismuth) tris(glycoldimercaptoacetate) and mixtures thereof.

11. The composition of claim 1 wherein said vinyl halide resin is poly(vinyl chloride).

12. The composition of claim 1 wherein the stabilizer composition is liquid and shelf-stable at ambient temperatures.

13. The composition of claim 1 wherein the relative amount of said antimony or bismuth compound is from about 0.05 to about 5 parts by weight per 100 parts resin and the relative amount of synergist present is from about 1 to about 20 percent by weight of said antimony or bismuth compound.

* * * * *